(12) United States Patent
Barthel et al.

(10) Patent No.: US 11,885,449 B2
(45) Date of Patent: Jan. 30, 2024

(54) QUICK CONNECTOR WITH TOOL RELEASE

(71) Applicant: TI Automotive (Fuldabrück) GmbH, Fuldabrück (DE)

(72) Inventors: Iris Barthel, Schauenburg (DE); Kay Bube, Schenklengsfeld (DE); Reiner Rohde, Malsfeld (DE); Seong-hwa Choo, Incheon (KR); Dong-hyeok Lee, Gyeonggi-do (KR); Andre Häckel, Waldeck (DE); David Gabbey, Pinckney, MI (US); Jeong-gi Choi, Incheon (KR)

(73) Assignee: TI AUTOMOTIVE (FULDABRUECK) GMBH, Fuldabrueck (DE)

( * ) Notice: Subject to any disclaimer, the term of this patent is extended or adjusted under 35 U.S.C. 154(b) by 197 days.

(21) Appl. No.: 17/362,029

(22) Filed: Jun. 29, 2021

(65) Prior Publication Data
US 2021/0404492 A1    Dec. 30, 2021

(30) Foreign Application Priority Data
Jun. 30, 2020 (EP) .................................... 20183114

(51) Int. Cl.
*F16L 37/14* (2006.01)
(52) U.S. Cl.
CPC .................................. *F16L 37/144* (2013.01)
(58) Field of Classification Search
CPC ......... F16L 37/12; F16L 37/144; F16L 37/14; F16L 37/127; F16L 37/133; F16L 37/142; F16L 37/098; F16L 37/0982; F16L 37/0985
See application file for complete search history.

(56) References Cited

U.S. PATENT DOCUMENTS
2002/0079696 A1    6/2002    Szabo

FOREIGN PATENT DOCUMENTS

| CN | 101876387 A | 11/2010 |
| CN | 108139006 A | 6/2018 |
| DE | 102015003792 A1 | 10/2016 |
| DE | 102015106063 A1 | 10/2016 |

(Continued)

OTHER PUBLICATIONS

Translation JP6131120 (Year: 2017).*

*Primary Examiner* — Aaron M Dunwoody
(74) *Attorney, Agent, or Firm* — Dickinson Wright PLLC

(57) ABSTRACT

A quick connector for connection to a complementary counterpart comprises a coupling piece and a retainer for a section of a fluid having a coupling center axis defining an axial direction AD, a radial direction RD and a circumferential direction CD. The retainer is allocated to the coupling end, wherein the retainer has at least one retaining element for retaining the counterpart and at least one actuating element for opening the retainer for pulling the counterpart out of the coupling piece. The coupling piece comprises a first flange at the coupling end, wherein the first flange has a flange opening so as to insert a tool into the flange opening so that the tool can exert a force on the retainer and the actuating element, respectively. The flange opening has an outer border, wherein the outer border lies in radial direction RD outward of the flange opening.

17 Claims, 6 Drawing Sheets

(56) References Cited

FOREIGN PATENT DOCUMENTS

| | | | | |
|---|---|---|---|---|
| EP | 2402640 | A1 | 1/2012 | |
| JP | 2004019781 | A | 1/2004 | |
| JP | 2015004381 | A | 1/2015 | |
| JP | 6131120 | * | 5/2017 | ............ F16L 37/133 |
| WO | 2008153510 | A1 | 12/2008 | |
| WO | 2008093627 | A1 | 5/2010 | |

* cited by examiner

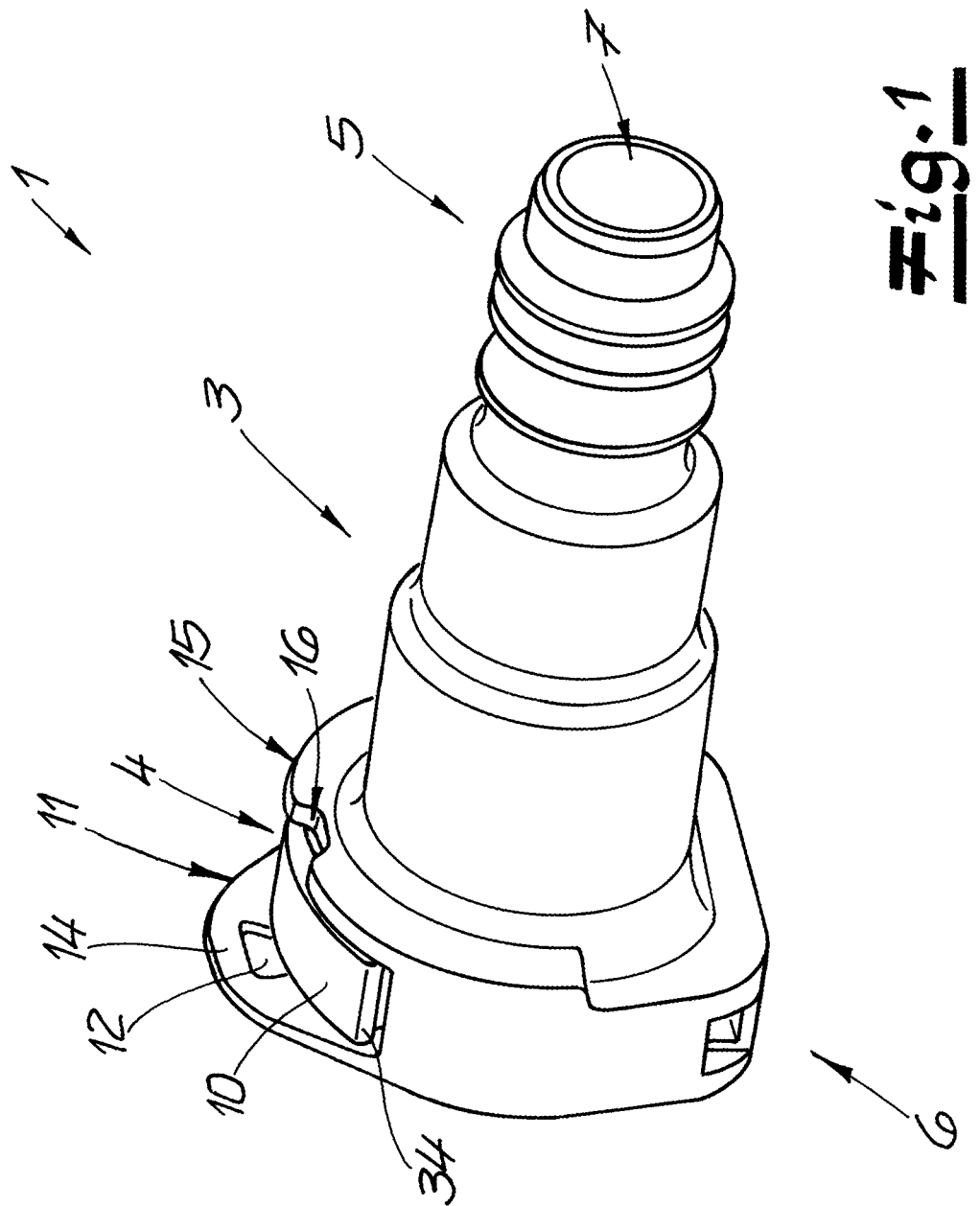

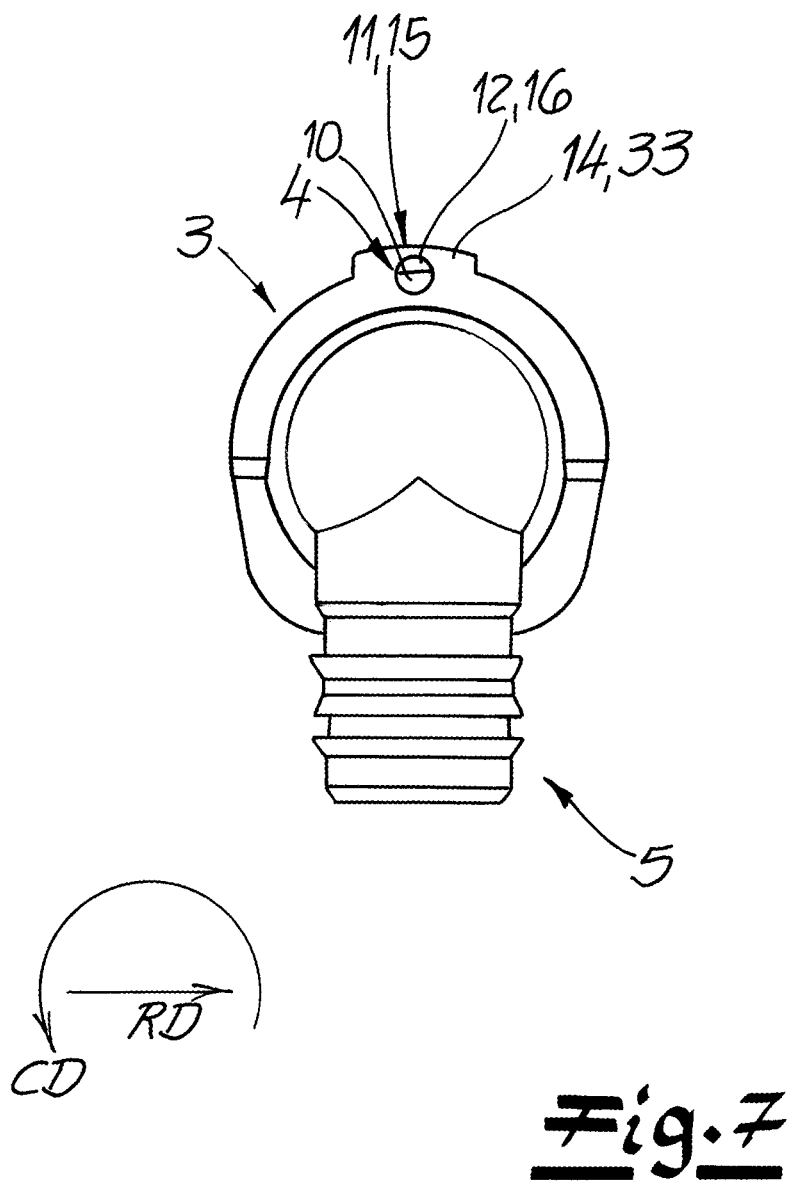

QUICK CONNECTOR WITH TOOL RELEASE

RELATED APPLICATIONS

The present disclosure claims priority to European Application 20183114.6 filed on Jun. 30, 2020, the entire contents of each of which are incorporated herein by reference.

FIELD

The disclosure refers to a quick connector for connection to a complementary counterpart, wherein the quick connector comprises a coupling piece and a retainer, wherein the coupling piece has a fluid line end for connection to a fluid line and a coupling end for introducing the counterpart, wherein the retainer comprises at least one actuating element for opening the retainer for pulling the counterpart out of the coupling piece, wherein the coupling piece comprises a first flange at the outside of the coupling end, wherein the first flange has a flange opening so as to insert a tool into the flange opening so that the tool can exert a force on the retainer and the actuating element, respectively. The disclosure also refers to a quick connector assembly comprising the quick connector and the complementary counterpart, a vehicle comprising the quick connector assembly and a method for releasing a quick connector assembly.

BACKGROUND

A quick connector for connection to a complementary counterpart with a circumferential collar is known from DE 10 2015 003 792 A1, wherein the quick connector comprises an angled coupling piece and a U-shaped retainer. The quick connector comprises a fluid line end for connection to a fluid line and a coupling end for introducing the counterpart. The retainer is located at the coupling end and comprises numerous retaining elements which are formed as barbs. The retaining elements are arranged at the U-legs and at the U-base of the retainer allowing the circumferential collar of the counterpart to latch within the coupling piece when it is inserted into the coupling piece. The retainer also has at least one actuating element for opening the retainer for pulling out the counterpart. The actuating element is the U-base of the retainer.

The coupling piece in DE 10 2015 003 792 A1 has a flange at the coupling end, so that the U-base of the retainer can be sunk completely or nearly completely into the coupling piece. This serves to indicate full insertion of the retainer within the coupling piece. The flange comprises a flange opening so that a tool can be guided through the flange opening so as to position the tool tip between the U-base of the retainer and the coupling piece. As a result, the retainer can be pulled or levered out of the coupling piece by conducting lever movements of the tool handle towards the coupling piece and away from it. However, such lever movements need free space around the coupling piece which we have discovered is often not given in modern vehicles.

BRIEF SUMMARY

It is therefore an object of the disclosure to provide a quick connector in which opening the retainer requires even less free space around the quick connector and coupling piece, respectively.

A quick connector for connection to a complementary counterpart is provided which requires less free space there around to open, wherein the quick connector comprises a coupling piece and a retainer, wherein the coupling piece has a fluid line end for connection to a fluid line and a coupling end for introducing the counterpart, wherein a fluid channel of the coupling piece fluidly connects the coupling end to the fluid line end, wherein a section of the fluid channel assigned to the coupling end has a coupling center axis, wherein the coupling center axis defines an axial direction AD, a radial direction RD and a circumferential direction CD, wherein the retainer is allocated to the coupling end, wherein the retainer has at least one retaining element for retaining the counterpart, wherein the retainer comprises at least one actuating element for opening the retainer for pulling the counterpart out of the coupling piece, wherein the coupling piece comprises a first flange at the outside of the coupling end, wherein the first flange has a flange opening so as to insert a tool into the flange opening so that the tool can exert a force on the retainer and the actuating element, respectively, wherein the flange opening of the first flange has an outer border, wherein the outer border lies in radial direction RD outward of the flange opening.

The term "complementary counterpart" preferably means that the counterpart can be connected fluidically tight with the coupling piece and the quick connector, respectively. It is advantageous that the counterpart is a male counterpart, wherein the quick connector is the according female element. It is preferred that the counterpart comprises a latching element which in particular is a collar. It is also possible that the counterpart has a groove as a latching element. In a preferred embodiment, the retainer is a latching element of the quick connector which is complementary to the latching element of the counterpart. It is very preferable that the retainer latches the counterpart/collar in such a way that the counterpart is retained within the quick connector/the coupling piece.

It is possible that the coupling piece is angled or straight. With an embodiment having a straight coupling piece, the coupling center axis might be identical to a fluid line center axis. If the coupling piece is angled, the coupling center axis is not identical to the fluid line center axis. The terms "axial direction AD", "radial direction RD" and "circumferential direction CD" preferably only refer to the coupling center axis.

The tool is preferentially elongated so that fingers around the quick connector are not needed for actuating the retainer. The tool might be, for example, a screwdriver or a special, elongated tool. The tool can be a flat-blade screwdriver. The tool might comprise a handle and/or a tool tip. The tool tip preferably has an interacting element for interacting with the border of the flange opening and/or with the edge of the flange aperture. The interacting element can be, for example, a barb for latching on/catching the border of the flange opening and/or the edge of the flange aperture. The interacting element preferentially prevents gliding the tool off the quick connector.

It is preferred that a force causes a movement of the tool, whereupon the force of the tool is deflected so that the retainer is moved in radial direction RD inward. In an advantageous embodiment, the deflected force is transmitted via a broad or a thin flank of the tool tip. In particular, the force is not transmitted from the face end of the tool tip onto the retainer. For example, the tool tip of the special tool has, in a front view, an elongated rectangular face end with two broad (or elongated) flanks and with two thin flanks. The force of the flanks of the tool is preferentially deflected via the outer border of the flange opening onto the retainer. It is within the scope of the disclosure that the outer border is part of the first flange.

The disclosure is initially based on the finding that actuation of the actuating element by hand in many cases requires too much space around the quick connector. Furthermore, it was found that the outer border of the flange opening preferably acts as a counter bearing and allows forces to be transmitted from a tool to the retainer so as to push the retainer in radial direction into the coupling piece. Therefore, practically no additional space for detaching the coupling piece from the counterpart (e.g. for maintenance work) is required around the coupling piece.

The disclosure includes a structure whereby the outer border serves as a counter bearing, so that the tool can transmit forces radially inwards. For example, a translational movement of the tool which runs purely in the axial direction AD over a ramp on the outside of the actuating element can be converted into a radial inward force/movement of the retainer. It is also possible, for example, to rotate a tool tip inserted into the flange opening around a length axis of the tool, so that a broader side of the tool tip is no longer oriented in circumferential direction CD, but rather is oriented edgewise in the radial direction RD. This as well might exert a radial inward force on the retainer with the help of the outer border.

Both movements can be carried out with an elongated tool, so that the space-consuming hand is no longer required on the coupling piece. Likewise, there is no need for lever movements of the tool itself. As a result, the coupling piece/quick connector can be installed even more compactly, so that the above-mentioned object is achieved.

According to a preferred embodiment, the outer border is part of a closed, circumferential border of the flange opening. It is preferred that the flange opening has two side borders extending at least section-wise in radial direction RD outward in direction to the outer border. The inner contour of the border of the flange opening is preferably rounded for rotation of the tool within the flange opening. Preferentially, the thickness of the outer border in radial direction RD is at least 0.5/1.0/1.5 mm. The outer border/first flange preferably has a thickness in axial direction AD of at least 0.5/0.8/1.0 mm.

It is preferred that the coupling piece, the retainer, the first flange, the actuating element, and/or the outer border is/are designed so that in force of a movement of the tool can be deflected so as to exert a force acting inward in radial direction RD on the retainer. According to an embodiment, a force of a translational movement, preferably in axial direction AD, can be deflected so as to exert a force acting inward in a radial direction RD on the retainer. It is very preferred that the tool and/or the retainer and/or the actuating element has/have a tapered surface in a side view of the quick connector in order to deflect the force of the tool onto the force onto the retainer. It is very advantageous that the actuating element comprises a ramp in a side view of the quick connector. A surface of the ramp of the actuating element preferably increases in a side view of the quick connector in radial direction RD outward in direction to the first flange. It is advantageous that the ramp of the actuating element increases radially outward in axial outward direction AD. The tip of the tool may be rounded or tapered or even rectangular in a side view. It is however preferred that the tip of the tool in a side view is tapered or rounded.

According to an embodiment, the retainer and/or the coupling piece is/are designed so that a force of a rotational movement of the tool around a length axis of the tool can be deflected so as to exert a force acting inwardly in the radial direction RD on the retainer. It is preferable that the tool is not rotationally symmetric with respect to its length axis at the face end and/or along a cross section near the face end. The tool tip might be rectangular, quadratic or oval. For example, if the tool tip is rectangular in a front view/cross section, a rotation around the length axis of the tool can exert a force onto the retainer and actuating element, respectively by using the outer border as a counter bearing. It is very preferred that the actuating element has at least section-wise a smooth surface so that the tool can slide over it.

It is preferential that the retainer and/or the coupling piece comprises at least one fixing element to fix the retainer to the coupling piece when the retainer is inserted in the coupling piece and is ready for receiving/retaining/interacting with the counterpart (ready state of the retainer). Advantageously, the at least one fixing element of the retainer and/or the coupling piece is a latching element. It is preferred that the at least one latching element of the retainer protrudes into the latching element of the coupling piece. The latching element of the retainer preferably is a projection which preferentially protrudes in axial direction AD. The at least one latching element of the retainer preferably extends outwardly in axial direction AD. It is advantageous that the retainer comprises two fixing elements/latching elements, wherein it is preferred that one fixing element is allocated to the left side and one to the right side of the retainer in a front view. In particular, each fixing element may be allocated to a retaining element of the retainer. In case that the retainer is U-shaped, the fixing elements each may be located on the according retaining element/U-leg. Preferentially, the fixing element is disposed in an upper half/third/fourth of the according retaining element/U-leg of the retainer.

It is preferred that the fixing element of the coupling piece is a groove interacting with the fixing element of the retainer. In particular, the fixing element of the retainer is disposed within the fixing element of the coupling piece when the retainer is in its ready state. The groove of the coupling piece preferably extends in an upward direction in a front view of the quick connector. Advantageously, the coupling piece comprises two fixing elements, wherein each fixing element of the coupling piece is allocated to an according fixing element of the retainer. It is preferred that the fixing elements of the retainer and/or the coupling piece are disposed symmetrically to each other in a front view of the quick connector. The fixing element of the coupling piece is preferably elongated in such a manner that the fixing element of the retainer can travel within the fixing element of the coupling piece for at least 1 mm.

It is advantageous that the retainer and/or the coupling piece is/are designed such that when a pressure is applied in radial direction RD inward onto the actuating element, preferably in the ready state of the retainer, the retainer is opened so that the counterpart can be pulled out of the coupling piece. It is preferred that the retainer comprises two legs which are connected with the actuating element. Advantageously, each of the legs comprises one of said retaining elements. It is possible that the retainer comprises a closing element which closes the retainer legs in a circumferential manner and which might be in opposition to the actuating element. According to an embodiment, the retainer is U-shaped in a front view of the quick connector. It is possible that the retainer is ring-shaped so that the retainer might have a closed or nearly closed oval or circular shape in a front view. It is very preferred that the retainer and/or the coupling piece is designed so that said pressure onto the actuating element results in spreading the legs and the retaining elements, respectively, in radial direction RD outward.

According to a preferable embodiment, the retainer comprises at least one stop element for stopping the movement of the retainer in radial direction RD inward.

The stop element might stop the retainer after a travel distance of at least 1 mm/2 mm. It is preferred that the at least one stop element interacts with a stop edge of the coupling piece, wherein the stop edge of the coupling piece stops a travel in radial direction RD inward of the stop element/the retainer. For example, the stop element might be located in the region of the connection of the leg/retaining element at the actuating element. The stop element of the retainer can protrude in radial direction in a front view of the retainer. The at least one stop element preferably is a radial projection. It is preferred that the retainer comprises two stop elements/radial projections which are more preferably symmetrically located to each other at the retainer in a front view of the retainer.

According to a preferential embodiment, the coupling piece comprises a second flange, wherein the second flange preferably has a flange aperture. Advantageously, the second flange flushes in radial direction RD with the actuating element in the ready state over at least a section in circumferential direction CD in a front view or a rear view of the quick connector. The flange aperture might be open or closed in radial direction RD outward. The second flange might have a thickness in axial direction AD of at least 0.5/0.8/1.0 mm. The flange aperture can have an outer edge, which preferably lies in radial direction RD outward of the flange aperture. It is preferred that the outer edge is part of a closed, circumferential edge of the flange aperture.

According to a preferred embodiment, the flange opening and/or the flange aperture overlap/s in a front view of the quick connector with the actuating element at least partially. It is advantageous that the first flange and/or the second flange overlap in a front view of the quick connector at least in part with the actuating element. Preferentially, the retainer has a symmetry axis in a front view running through the middle of the actuating element. It is within the scope of the disclosure that the first and/or second flange has a symmetry axis in a front view of the retainer. It is advantageous that the symmetry axis of the retainer in a front view is the same than the one of the first flange and/or the second flange. Preferably, the actuating element does not extend the first flange in a front view in radial direction RD outward.

It is within the scope of the disclosure that the first flange adjoins the retainer in the axial direction AD and is preferably arranged axially outside the retainer. It is preferred that the first flange is part of an end face of the coupling end of the coupling piece. It is possible that the end face of the coupling end is a front plate. Preferentially, the second flange adjoins the retainer in the axial direction AD and is preferably arranged axially inside the retainer. It is preferred that the first flange and the second flange form a cavitation for receiving the actuating element. It is in particular preferred that the first flange and/or the second flange directly adjoin the actuating element in axial direction.

Preferentially, at least one portion of the first flange extends in circumferential direction CD, wherein the flange opening belongs to the at least one portion of the first flange. Preferably, at least one portion of the second flange extends in circumferential direction CD, wherein the flange aperture belongs to the at least one portion of a second flange. It is very preferred that the first flange and/or the second flange completely extends in circumferential direction CD. It is preferable that the first flange and/or the second flange defines a plane or planes, wherein the normal of this plane/planes extend in axial direction AD. It is very preferred that the areas of the flange opening and of the flange aperture overlap in a front view. According to a preferred embodiment, the coupling piece and the retainer, respectively, is/are designed such that the tool is to be inserted in the axial direction AD+/−45°, more preferable +/−30° and even more preferable +/−20° into the flange opening in order to press the retainer in radial direction RD inward.

It is preferred that the actuating element has a smooth outer surface allowing the tool to slide over. In particular, the retainer does not comprise signs, letters or numbers forming a relief on its outer surface as shown in DE 10 2015 003 792 A1. It is preferred that the outer surface of the actuating element is at least partially convex.

It is within the scope of the disclosure that the retainer and/or the coupling piece—preferably mainly—comprises a polymer. The term "mainly" preferentially means that the retainer and/or the coupling piece consists of at least 50/70/90/95% by weight of a polymer. Advantageously, the polymer of the retainer and/or the coupling piece is a polyamide, for example a PA 6, 6.6, 10, 11, or 12. The coupling piece and/or the retainer might be a single piece resulting from injection moulding. It is also possible that the coupling piece comprises of two or more connected parts which each might have been produced by injection moulding and which might have been connected via glueing, latching or welding.

It is advantageous that the retainer and the at least one retaining element and the leg, respectively, comprises an insertion surface. The insertion surface can be shaped conically over at least a section for easier insertion of the counterpart. It is preferred that a retaining element or the retaining elements is/are tapered in the region of the insertion surface/the insertion surfaces for easier insertion of the counterpart.

According to a very preferred embodiment, the outer border of the flange opening and/or the outer edge of the flange aperture is/are designed so as to serve as a counter bearing withstanding forces of the retainer acting on the tool when the tool is contracting the retainer. Preferentially, the first flange has a highest point in the radial direction RD, the highest point being at least 3 mm, preferably at least 4 mm from a highest point of the actuating element in a radial direction RD in a front view. The height of the flange opening in the radial direction RD is preferably at least 1.0 mm and more preferably at least 2.0/3.0 mm.

The above-mentioned object is solved by a quick connection assembly with a quick connector according to the disclosure and with a complementary shaped counterpart for insertion into the coupling piece. The counterpart preferably comprises a collar which more preferably extends along 360° in circumferential direction CD. It is within the scope of the disclosure that the counterpart comprises a shaft for interacting with a sealing ring of the quick connector. The counterpart might have a rounded tip at the end of the shaft for smooth insertion into the quick connector. The counterpart can have a connection end opposite to the rounded tip for connection with a fluid line or an aggregate like a tank or a dosing pump. It is preferred that the collar is placed between the connection end and the shaft. Preferentially, the shaft is disposed between the rounded tip and the collar. The collar is advantageously designed so as to interact with the retaining element/the retaining elements of the retainer and in particular to spread the retaining element/retaining elements while inserting the counterpart into the quick connector. The collar preferably is designed to rest in a collar chamber of the quick connector.

The quick connector/coupling piece preferentially comprises a collar chamber for receiving the collar, and/or a sealing package for sealing the shaft within the coupling piece fluidically tight. The collar chamber might be located in axial direction AD between the retaining element/elements and the sealing package of the quick connector. The sealing package advantageously comprises at least one sealing ring. Preferably, the sealing package comprises two sealing rings with an optional spacer in between. It is preferred that the sealing ring/sealing rings are fixed within the coupling piece with the help of a latching device. The latching device might be a sleeve. The latching device is preferentially placed between the collar chamber and the at least one sealing ring in axial direction AD. The coupling piece/quick connector might have a receiving chamber for receiving the tip of the counterpart. It is preferred that the sealing package is located in axial direction between the collar chamber and the receiving chamber. Preferentially, the receiving chamber comprises in axial direction AD towards the fluid line end a stop for stopping an insertion of the counterpart and the tip, respectively.

The above-mentioned object is achieved by a vehicle comprising a quick connector according to the disclosure or a quick connection assembly according to the disclosure, wherein the flange opening is faced upward and preferably vertically. The term "the flange opening is faced upward" preferably means that a normal of the area of the flange opening extends upward. It is very preferred that the coupling end is facing downward. Preferentially, the counterpart is fixed, while the quick connector is movable after releasing from the counterpart. According to a preferred embodiment, the vehicle comprises an electric-vehicle battery for powering an electric drive motor.

The above-mentioned object is achieved by a method for releasing a quick connection assembly, in particular a quick connection assembly according to the disclosure, wherein the quick connection assembly comprises a quick connector and a complementary counterpart, wherein the quick connector is connected to the complementary counterpart within a vehicle, wherein the quick connector comprises a coupling piece and the retainer, wherein a tool is used for releasing the retainer from the coupling piece, wherein the tool is moved so that the retainer releases the counterpart, wherein the coupling piece and the retainer, respectively, is/are designed so that the force of the movement of the tool is deflected by the coupling piece and/or the retainer in such a way that the retainer is pressed into the coupling piece that by releasing the counterpart.

It is very preferred that the movement of the tool extends downward and more preferable in vertical direction. It is very preferred that the quick connector of the method comprises one or more features of the quick connector according to the disclosure. The counterpart preferably comprises one or more features of the counterpart according to the disclosure of the quick connector assembly.

BRIEF DESCRIPTION OF THE DRAWINGS

Two exemplary embodiments of the disclosure are explained in more detail below with reference to several schematic figures. It is shown in FIG. 1 a perspective view of a quick connector of the first embodiment, FIG. 2 a perspective view of a retainer of the quick connector of FIG. 1, FIG. 3 a perspective view of a counterpart which is complementary to the quick connector of FIG. 1, FIG. 4 a cross-section of the quick connector of FIG. 1 along its length axis, FIG. 5A a front view of the quick connector of FIGS. 1 and 4 with the retainer of FIG. 2 in a closed state, FIG. 5B the front view of FIG. 5A with the retainer in an open state, FIG. 6A a side view of the second embodiment with a second quick connector with the retainer in a closed state, FIG. 6B the quick connector of FIG. 6A with the retainer in an open state, and FIG. 7 a rear view of the quick connector of FIG. 6A.

DETAILED DESCRIPTION

Figure 3:
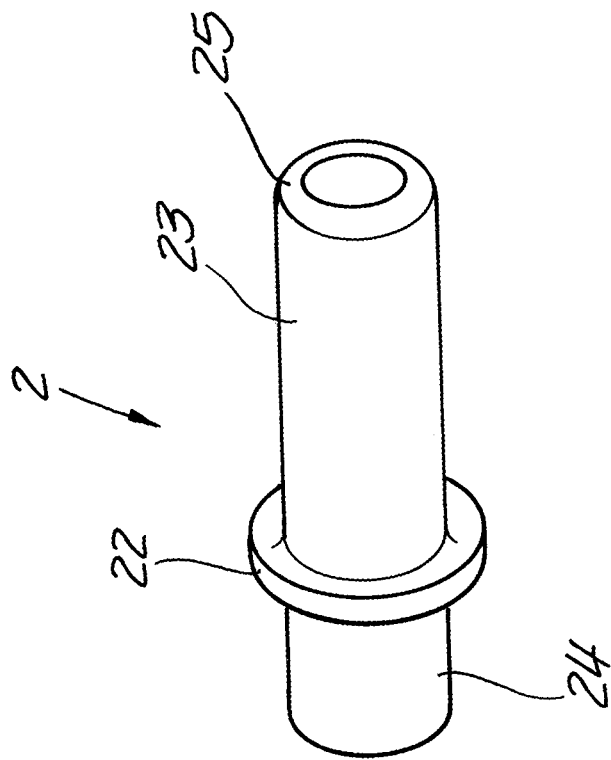

FIG. 1 visualizes a quick connector 1 of a first embodiment of the disclosure. The quick connector 1 comprises a coupling piece 3 and a retainer 4. The coupling piece 3 has a fluid line end 5 which is preferentially designed to be inserted into a fluid line. The fluid line end 5 therefore might comprise barbs and a groove for receiving a sealing ring. According to a further embodiment the fluid line end 5 might comprise a hollow-cylinder seat for inserting the end of a fluid line. In this case the fluid line end 5 and the fluid line can be connected by laser-beam welding or by spin welding.—The coupling piece 3 further comprises a coupling end 6 which receives the retainer 4.

Figure 2:
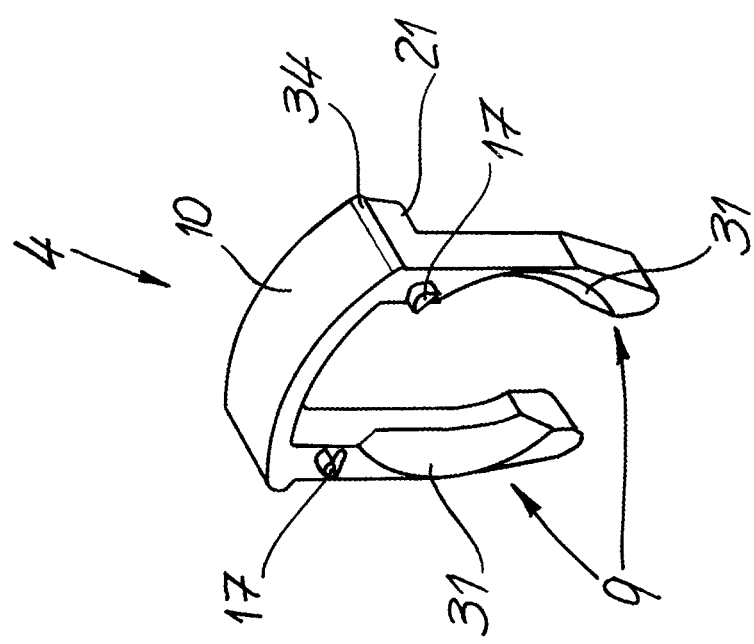

Turning now to FIG. 2, the retainer 4 is preferably U-shaped and comprises an actuating element 10 as U-basis as well as two U-legs. Each of the U-legs serves as a retaining element 9. Both retaining elements 9 have an insertion surface 31 which is basically conically shaped and which enables an easy insertion of a counterpart 2 (please see FIG. 3). It is preferred that each retaining element 9 and U-leg, respectively, comprises an axial projection 17 which is located in an upper fourth of the according U-leg. The axial projections 17 project in a side view of the retainer 4 in axial direction AD and might comprise a lower, tapered surface. The retainer 4 preferably comprises a shoulder 21 at each retaining element 9 so that the actuating element 10 is broader than the retaining elements 9 in axial direction AD.

Turning now back to FIG. 1, the actuating element 10 of the retainer 4 is preferably located between a first flange 11 and a second flange 15. The second flange 15 advantageously flushes in radial direction RD over at least a section in circumferential direction CD with the actuating element 10. This can serve as an indicator that the retainer 4 has been fully inserted into the coupling piece 3.

FIG. 1 furthermore highlights that the first flange 11 comprises a flange opening 12, wherein in the flange opening 12 preferentially has a closed border around 360°. An outer border 14 lies in radial direction RD outward the flange opening 12 and is advantageously part of the closed border of the flange opening 12. The second flange 15 preferentially comprises a flange aperture 16. It is preferable that the flange aperture 16 of this embodiment does not have an outer border. An imaginary line of the flange aperture 16 in circumferential direction CD continues the second flange 15 in the region of the flange aperture 16 and defines an area of the flange aperture 16 in a front view. It is very preferred that the area of the flange aperture 16 overlaps at least in part with the area of the flange opening 12 in a front view.

It has to be noted that the retainer 4/actuating element 10 preferably comprises a stop element for stopping the movement of the retainer in radial direction RD inward. The stop element can be a radial projection 34 projecting in radial direction RD with respect to the according retaining element 9. As can be seen in FIG. 1, the coupling piece 3 and the retainer 4 are advantageously designed in such a way that a space is left between the radial projection 34 and a stop edge of the coupling piece 3 when the retainer 4 is in a fully inserted state. The retainer 4 shown in FIG. 1 is furthermore in a closed or relaxed state with reference to the retaining elements 9.

FIG. 3 depicts the counterpart 2 which is designed complementary with respect to the quick connector 1. The complementary counterpart 2 preferentially comprises a collar 22, a shaft 23, a connection end 24 and/or a tip 25. The connection end 24 may be designed to be connected with a fluid line or with an aggregate (e.g. a tank, a dosing pump, and the like). It is very preferable that the counterpart 2 is according to a SAE-standard.

Figure 4:
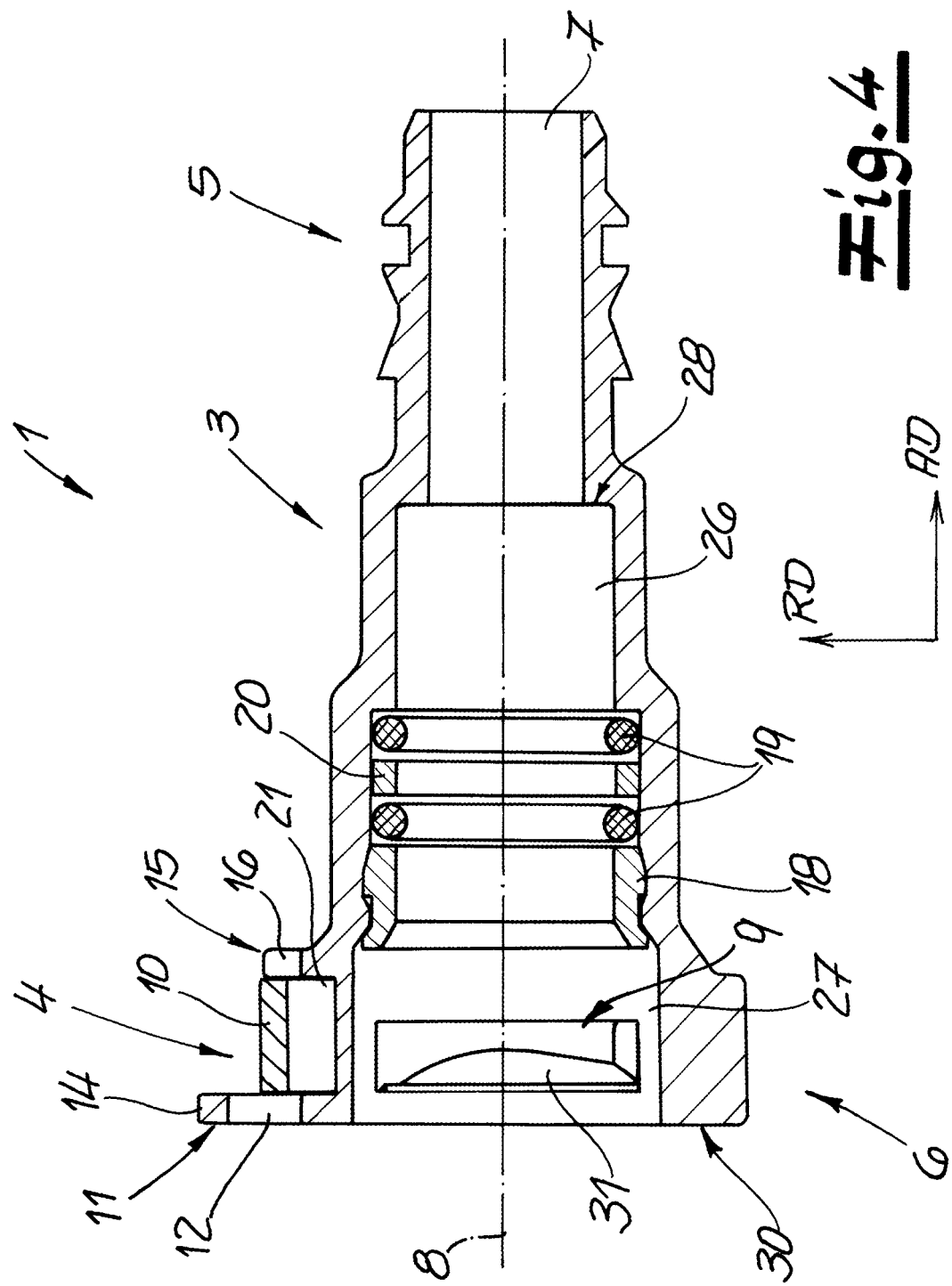

Turning now to the cross-section of FIG. 4, a fluid channel 7 connects the fluid line end 5 fluidically with the coupling end 6. A section of the fluid channel is allocated to the coupling end 6 and has a coupling center axis 8. It is preferred that the coupling center axis 8 defines an axial direction AD, a radial direction RD and a circumferential direction CD. The quick connector 1 preferably comprises a sealing package 18, 19, 20. The sealing package 18, 19, 20 might comprise two sealing rings 19 and an optional spacer 20 therebetween. The sealing rings 19 and the spacer 20 are advantageously kept in place by insertion of a sleeve 18 which is snapped into the coupling piece 3. A preferred receiving chamber 26 is positioned between the sealing package 18, 19, 20 and a preferable stop 28 of the coupling piece 3. The coupling piece 3 preferentially comprises a collar chamber 27 which might be located between the retaining elements 9 and the sealing package 18, 19, 20.

During the insertion procedure, the collar 22 first contacted the insertion surfaces 31 of the retaining elements 9 and then spreads the retaining elements 9 apart from each other. When the collar 22 reached the collar receiving chamber 26, the retaining elements 9 abruptly relaxed so that the counterpart is snapped within the quick connector 1. Now, the rounded tip 25 is located in the receiving chamber 26, while the sealing rings 19 tightly seal the shaft 23 while the collar 22 rests within the collar chamber 27.

Figure 5A:
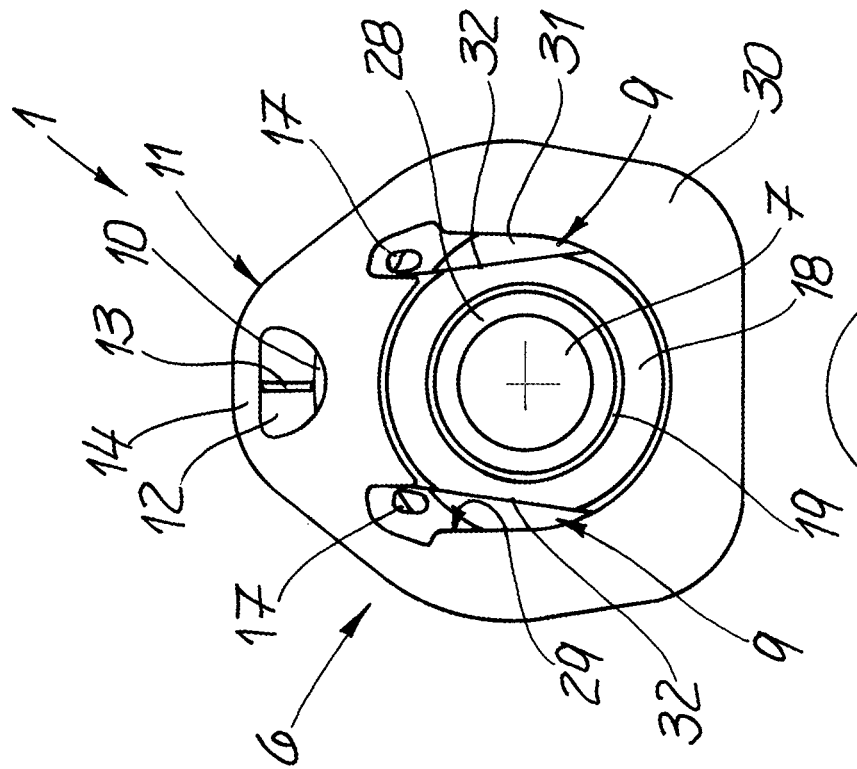

FIG. 5A stresses that the first flange 11 is advantageously part of a face end of the quick connector 1. The face end of the quick connector 1 in the region of the coupling end 6 is realized by a front plate 30. The retainer 4 is in a fully inserted state which is preferably defined by fixing elements of the retainer 4 and the coupling piece 3, respectively. In this embodiment, the retainer 4 comprises two fixing which are designed as axial projections 17. The coupling piece 3 and the front plate 30, respectively, might have complementary fixing elements which are formed as grooves 29. It is preferred that said axial projections 17 rest in the grooves 29 of the front plate 30. The axial projections 17 each might have a tapered surface on their lower end for easy insertion of the retainer 4 into the coupling piece 3. The retainer 4 and the retaining elements 9, respectively, are in an inserted and in a closed or relaxed position in FIG. 5A (ready state). In this closed position, inner rims 32 of the retaining elements 9 basically extend in a vertical direction. This applies for the counterpart 2 being out of the quick connector 1 as well as for the counterpart 2 being completely inserted.

Figure 5B:
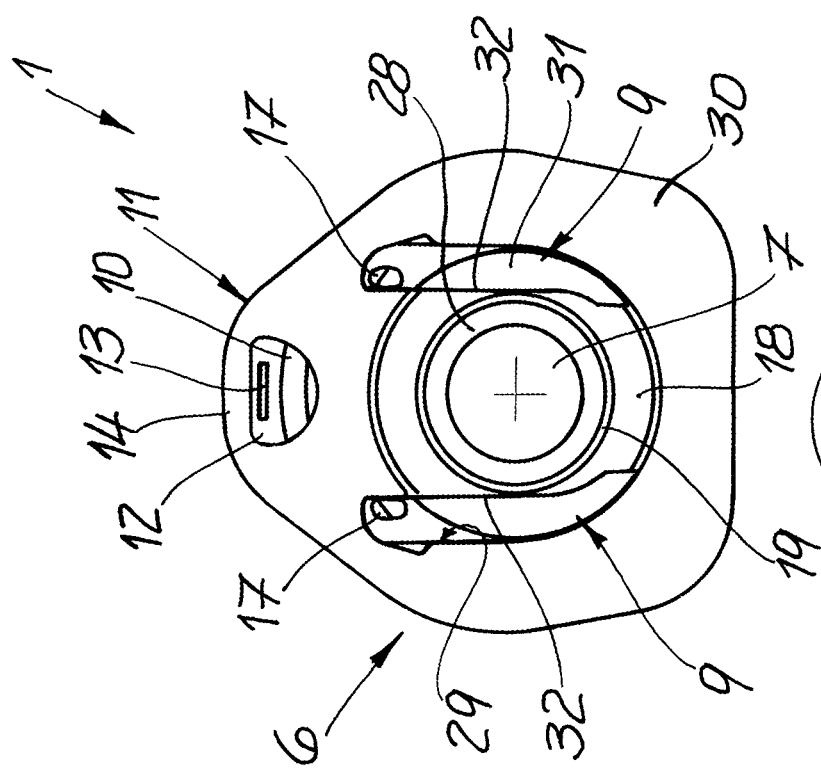

In order to release the inserted counterpart 2 from the quick connector 1, a special tool 13 can be inserted into the flange opening 12. The flat-blade of the tool 13 might be oriented in a horizontal direction in FIG. 5A and thus basically in circumferential direction CD. The flat-blade is thus arranged between the outer border 14 of the first flange 11 and the actuating element 10 of the retainer 4. In a second step, the tool 13 is rotated around 90° which can be seen in FIG. 5B. This rotation results in a pressing force in radial direction RD inward onto the actuating element 10 and the retainer 4, respectively. The pressing force pushes the actuating element 10 a few millimeters radially inward. This in turn—due to a preferred design of the retainer 4 and the coupling piece 3—results in spreading the retaining elements 9 apart from each other which can be seen in particular with respect to the inner rims 32 of the retaining elements 9 (FIG. 5B). The retaining elements 9 are now in an open state or position allowing to release the counterpart 2 from the quick connector 1.

Figure 6A:
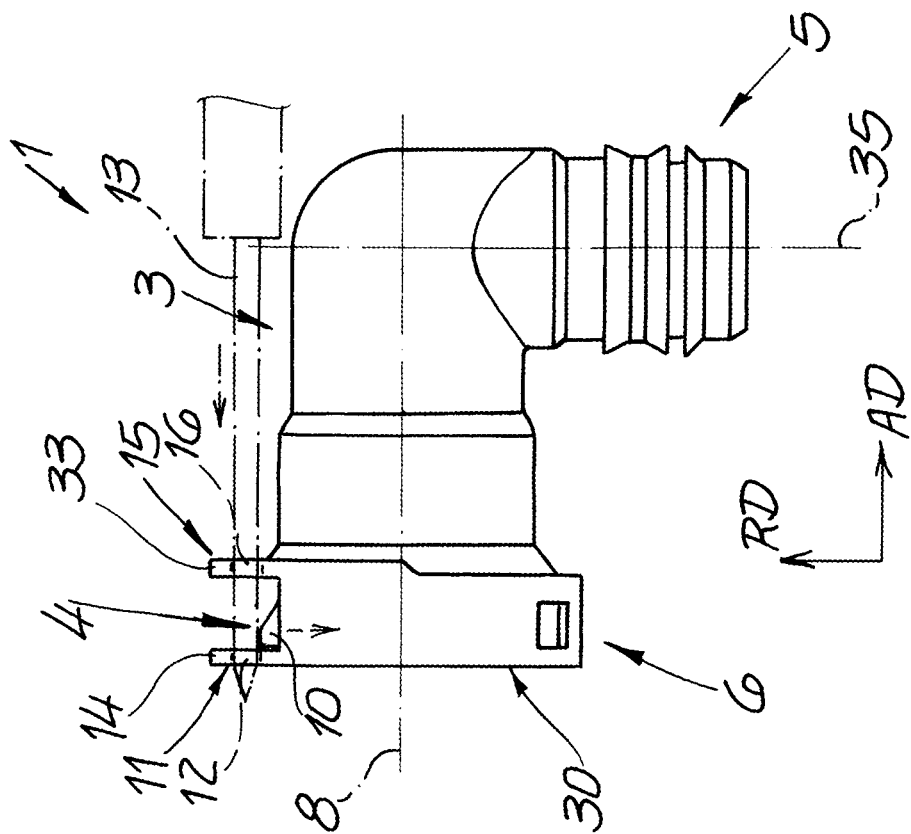

A second embodiment of the disclosure is highlighted in FIG. 6A. The second embodiment is basically the same like the first embodiment but has the following differences compared to the first embodiment. The coupling piece 3 of the second embodiment preferably is angled so that the coupling center axis 8 and a fluid line axis 35 include an angle of about 90°. The retainer 4 of the second embodiment has the same retaining elements 9 like the one of the first embodiment.

However, the actuating element 10 and the U-basis, respectively, is different with respect to the retaining element 10 of the first embodiment. As can be seen in FIG. 6A, the actuating element 10 in a side view might comprise a ramp increasing from the second flange 15 to the first flange 11. In the second embodiment, the first flange 11 and the second flange 15 basically have the same radial height so that the second flange 15 of the second embodiment can be somewhat higher in radial direction RD than the second flange 15 of the first embodiment. This is due to a preferred outer edge 33 of the second flange 15 which closes a flange aperture 16 of the second flange 15. As is shown in FIG. 7, the flange opening 12 as well as the flange aperture 16 can have a circular shape.

Figure 6B:
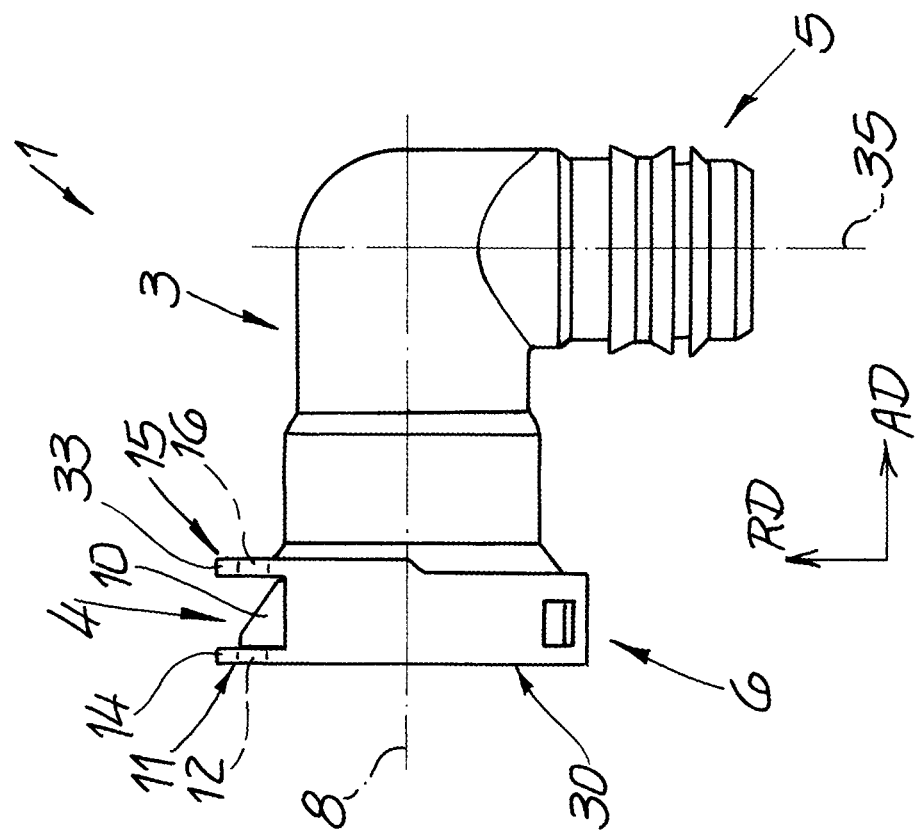

The flange opening 12 and the flange aperture 16 of the second embodiment serve as a guiding for a tool 13 which is shown in FIG. 6B. The tool 13 of the second embodiment is also a special tool which is inserted into the flange aperture 16 and the flange opening 12 in axial direction AD. When the tip of the tool 13 comes into contact with the ramp of the actuating element 10, a pressing force is generated onto the retainer 4 in radial direction RD inward. Again, the retaining elements 9 are spread apart from each other as explained with respect to FIG. 5B.

| List of reference numbers | |
|---|---|
| No. | Designation |
| 1 | quick connector |
| 2 | counterpart |
| 3 | coupling piece |
| 4 | retainer |
| 5 | fluid line end |
| 6 | coupling end |
| 7 | fluid channel |
| 8 | coupling center axis |
| 9 | retaining element |
| 10 | actuating element |
| 11 | first flange |
| 12 | flange opening |
| 13 | tool |
| 14 | outer border |
| 15 | second flange |
| 16 | flange aperture |
| 17 | axial projection |

-continued

List of reference numbers

| No. | Designation |
|---|---|
| 18 | sleeve |
| 19 | sealing ring |
| 20 | spacer |
| 21 | shoulder |
| 22 | collar |
| 23 | shaft |
| 24 | connection end |
| 25 | tip |
| 26 | receiving chamber |
| 27 | collar chamber |
| 28 | stop |
| 29 | groove |
| 30 | front plate |
| 31 | insertion surface |
| 32 | inner rims |
| 33 | outer edge |
| 34 | radial projection |
| 35 | fluid line axis |

The invention claimed is:

1. A quick connector for connection to a counterpart that is complementary to the quick connector, wherein the quick connector comprises:
    a coupling piece; and
    a retainer;
    wherein the coupling piece has a fluid line end for connection to a fluid line and a coupling end for introducing the counterpart, wherein a fluid channel of the coupling piece fluidly connects the coupling end to the fluid line end, wherein a section of the fluid channel assigned to the coupling end has a coupling center axis, wherein the coupling center axis defines an axial direction (AD), a radial direction (RD) and a circumferential direction (CD),
    wherein the retainer is allocated to the coupling end, wherein the retainer has at least one retaining element for retaining the counterpart, wherein the retainer comprises at least one actuating element for opening the retainer for pulling the counterpart out of the coupling piece,
    wherein the coupling piece comprises a first flange at the outside of the coupling end and a second flange having a flange aperture, wherein the first flange has a flange opening structured for insertion of a tool into the flange opening so that the tool can pass through the opening to exert a force on the retainer and the actuating element, respectively, wherein the flange opening has an outer border, and wherein the outer border lies in radial direction (RD) outward of the flange opening.

2. The quick connector according to claim 1, wherein the outer border is part of a closed, circumferential border of the flange opening.

3. The quick connector according to claim 1, wherein the coupling piece, the retainer, the first flange, the actuating element, and/or the outer border is/are cooperatively designed so that a force of a movement of the tool in the axial direction (AD) or the circumferential direction (CD) is deflected so as to exert a force acting inwardly in radial direction (RD) on the retainer.

4. The quick connector according to claim 1, wherein the retainer and/or the coupling piece comprises at least one fixing element to fix the retainer to the coupling piece when the retainer is inserted in the coupling piece and is ready for receiving the counterpart.

5. The quick connector according to claim 1, wherein the retainer and/or the coupling piece is/are structured such that when a pressure is applied in radial direction (RD) inwards onto the actuating element the retainer is opened so that the counterpart can be pulled out of the coupling piece.

6. The quick connector according to claim 1, wherein the flange opening and/or the flange aperture at least partially overlap/s in a front view of the quick connector with the actuating element.

7. The quick connector according to claim 1, wherein the first flange adjoins the retainer in the axial direction (AD) and is arranged axially outside the retainer.

8. The quick connector according to claim 1, wherein at least one portion of the first flange extends in circumferential direction (CD), wherein the flange opening belongs to the at least one portion of the first flange.

9. The quick connector according to claim 1, wherein the actuating element has a smooth outer surface allowing the tool to slide over.

10. The quick connector according to claim 1, wherein the retainer and/or the coupling piece comprises a polymer.

11. The quick connector according to claim 1, wherein the outer border of the flange opening and/or an outer edge of the flange aperture is/are designed so as to serve as a counter bearing withstanding forces of the retainer acting on the tool when the tool is contracting the retainer.

12. A quick connection assembly comprising:
    a quick connector according to claim 1; and
    a complementary shaped counterpart for insertion into the coupling piece.

13. A vehicle comprising a quick connector according to claim 1, wherein the flange opening is facing upward.

14. The quick connector according to claim 1, wherein the flange opening is structured such that the tool can rotate in the circumferential direction (CD) about an axis of the flange opening that is generally parallel to the coupling center axis.

15. The quick connector according to claim 1, wherein the flange aperture of the second flange, in front view of the quick connector, at least partially overlaps with the flange opening of the first flange.

16. The quick connector according to claim 1, wherein the flange aperture of the second flange includes a closed, circumferential border defining the flange aperture.

17. A method for releasing a quick connection assembly, wherein the quick connection assembly comprises a quick connector and a complementary counterpart, wherein the quick connector is connected to the complementary counterpart within a vehicle, wherein the quick connector comprises a coupling piece and a retainer, the coupling piece having a first flange at the outside of the coupling end having a flange opening, the coupling piece having a second flange having a flange aperture, wherein the flange opening has an outer border, and wherein the outer border lies in radial direction (RD) outward of the flange opening, wherein a tool is used for releasing the retainer from the coupling piece, comprising the steps of:
    inserting the tool through the flange opening and the flange aperture; and
    moving the tool so that the retainer releases the counterpart, wherein the coupling piece and the retainer, respectively, is/are designed so that the force of the movement of the tool is deflected by the coupling piece and/or retainer in such a way that the retainer is pressed into the coupling piece thereby releasing the counterpart.

* * * * *